Nov. 20, 1934.  H. L. BLUM  1,981,797
FLUID METER
Filed Nov. 13, 1930   3 Sheets-Sheet 1

Inventor:
Hosmer L. Blum,
By Chas. M. Nissen,
Atty.

Nov. 20, 1934.     H. L. BLUM     1,981,797
FLUID METER
Filed Nov. 13, 1930     3 Sheets-Sheet 2

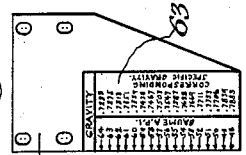
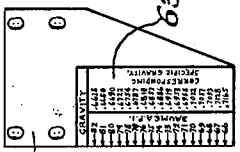
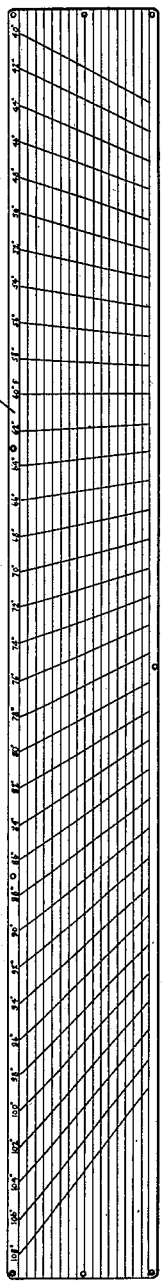
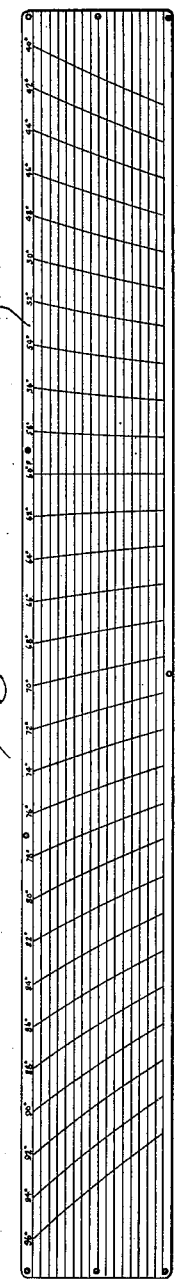

Patented Nov. 20, 1934

1,981,797

UNITED STATES PATENT OFFICE 1,981,797

FLUID METER

Hosmer L. Blum, Alameda, Calif., assignor to S. F. Bowser & Company, Inc., Fort Wayne, Ind., a corporation of Indiana Application November 13, 1930, Serial No. 495,333

7 Claims. (Cl. 73—30)

My invention relates to meters of the displacement type and one of the objects of my invention is to provide improved and efficient means for adjusting a meter of this type in accordance with variations of temperature and specific gravity of the liquid being measured by the meter. Although my invention is particularly adapted to meters of the displacement type, it may have a general application.

Another object of the invention is the provision of an adjustment dial having a scale and indexes to enable adjustments to be made in accordance with the temperature of the liquid flowing through a meter in order to maintain the accuracy of operation of the meter.

Another object of the invention is the provision of an adjusting dial for a meter having a scale associated with indexes to enable adjustments of the meter to be made in accordance with the specific gravity of the liquid being measured.

Another object of the invention is the provision of calibrated adjusting means for predetermining the flow through the meter of a predetermined percentage of liquid without being registered by the meter.

Another object of the invention is the provision of indexing mechanism for setting the meter adjusting means to cause the meter to pass without registration a predetermined quantity of the liquid as a sample.

Other objects of the invention will appear hereinafter, the novel features and combinations being set forth in the appended claims.

In the accompanying drawings, Fig. 1 is a sectional elevation of a meter embodying my invention;

Fig. 2 is an elevational view of the lower portion of a meter with my improvement mounted thereon;

Fig. 3 is an elevational view of a modification;

Fig. 4 is a developed calibrated temperature scale dial plate;

Fig. 5 is an elevational view of the specific gravity index plate;

Fig. 6 is a developed calibrated plate similar to that shown in Fig. 4, but for a different range of temperature; and Fig. 7 is an elevational view similar to Fig. 5, but having a different range of specific gravity indexes.

Figure 1:
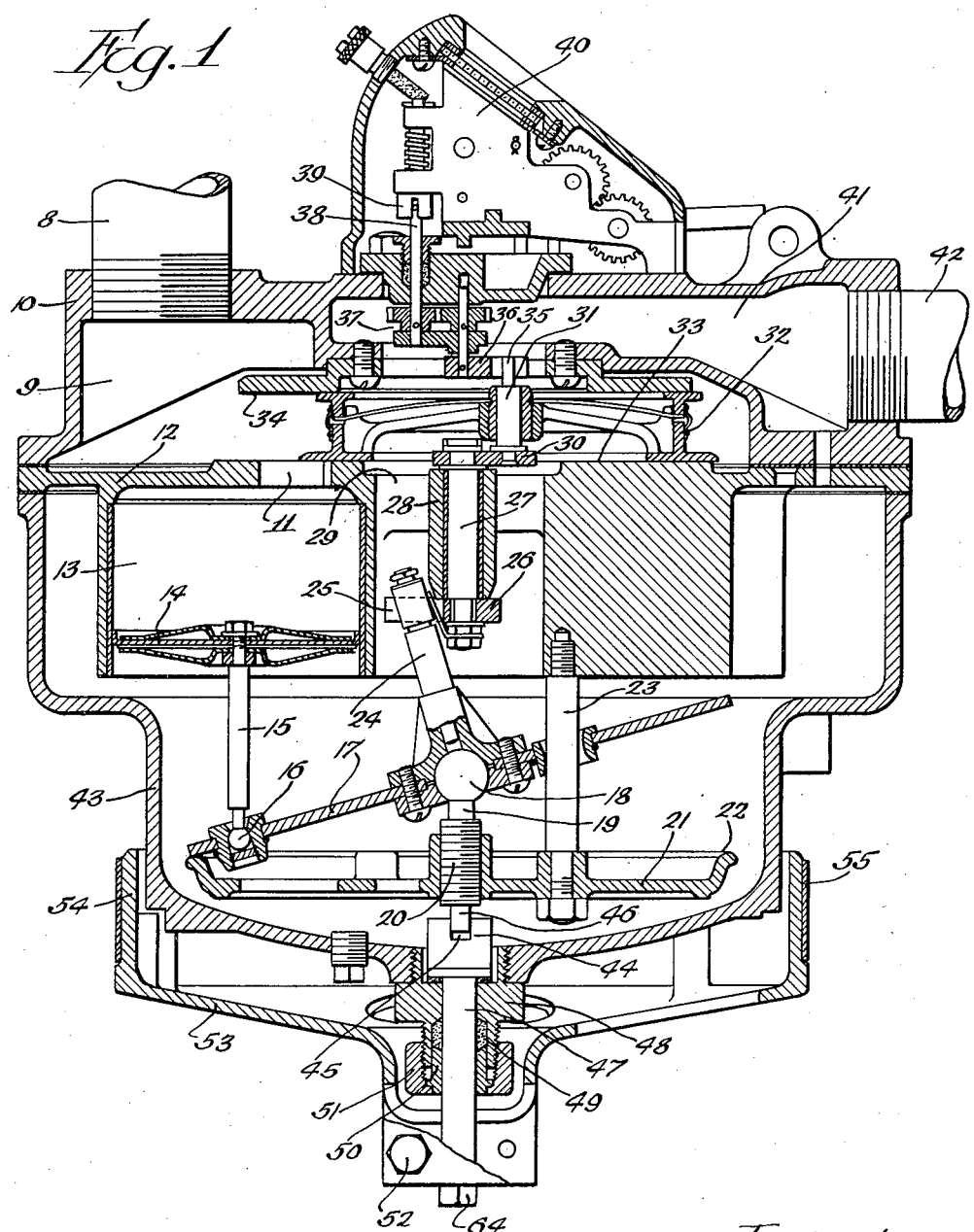

The meter shown in Fig. 1 is of the displacement type and may be similar to that shown, described and claimed in my Patent No. 1,423,597, issued July 25, 1922, for an Improvement in meters. The liquid enters the inlet port 8 and flows into the chamber 9 of the port casing 10. From the chamber 9 the liquid flows through the port 11 in the cylinder block 12 into the cylinder 13 above the piston 14. As shown in the patent above referred to, there are a plurality of pistons similar to those designated 14 in Fig. 1 connected by piston rods 15 and ball and socket joints 16 to a wabble plate 17.

The wabble plate 17 is mounted on the ball bearing 18 at the upper end of a vertical rod which is screw-threaded at 20 through the center of the stationary track plate 21. The periphery of the wabble plate 17 travels along the circular track 22 of the track plate 21 and the latter is rigidly secured by means of the suspension posts 23 to the bottom of the cylinder block 12.

Extending upwardly from the center of the wabble plate 17 is an upright lever 24, the upper end of which extends into a slot 25 of the lever 26 and the latter is secured to the vertical shaft 27 mounted in the bearing 28 secured to the radial brackets 29. The crank arm 30 at the upper end of the shaft 27 is provided with a pin 31. The circular valve 32 is journaled on the vertical pin 31 and is adapted to travel along the lower valve seat 33 and along the upper valve seat 34.

A pin 35 extends upwardly from the pin 31 into a slot in the crank arm 36 and through a train of gearing 37 motion is transmitted to the shaft 38 which is coupled at 39 to the registering device 40.

It will thus be seen that when liquid enters the chamber 9 and flows into the cylinder 13 the piston 14 is pushed down. The valve 32 controls the ports in the cylinder block 12 so that the pistons will be operated in such a way as to secure wabbling of the plate 17 on the track 22. When the pistons move up, the liquid flows through the upper cylinder ports into the chamber 41 and thence to the outlet port 42.

The wabbling of the plate 17 or the rolling of the periphery thereof on the track 22 will move the lever 24 along the path of an inverted cone and consequently rotation of the shaft 27 will be secured and operation of the valve 32. At the same time the registering device 40 is operated.

At the bottom of the bowl 43 is a key 44 which is provided with a transverse recess 45 for receiving the cross-piece 46 at the bottom of the vertical rod 19.

Connected to the lower side of the key 44 is an operating stem 47 which extends through the screw-threaded cap 48 and is provided with a liquid-tight connection at the packing 49. By reason of the screw-threaded cap 48 fitting into the screw-threaded opening in the bottom of the bowl 43 the key 44 may be entirely removed when desired.

The packing 49 is provided with a packing gland 50 and a screw-threaded cap nut 51 for securing the packing gland in place as shown in Fig. 1.

When the parts are assembled as shown in Fig. 1 and the key 44 is rotated by rotating the stem 47, the screw-threaded portion 20 of the vertical rod 19 causes a variation in the elevation of the ball 18 and this varies the angle of the inclination of the wabble plate 17 and consequently varies the stroke of the pistons 14 in the cylinders 13. When the ball 18 is raised the pistons 14 are likewise raised and therefore more liquid will flow into and out of the cylinders 13 for each rotation of the vertical shaft 27. When the ball 18 is lowered the amount of liquid flowing into and out of the cylinders 13 is decreased. It will thus be seen that the volumetric displacement will be increased by raising the ball 18 and decreased by lowering it. By means of the key 44 adjustment of the meter may be obtained so that the registering device 40 will accurately indicate the flow of the liquid from the inlet port 8 to the outlet port 42.

It is desirable when using the meter shown in Fig. 1 for measuring the flow of liquids that its registering device 40 shall register accurately at a certain temperature, usually 60° F. When the temperature of the liquid is above 60° F. it expands and consequently an adjustment of the meter should be made so that the displacement will be increased, and this is effected by raising the ball 18. Then the registration will take place as if the temperature of the liquid were 60° F.

When the temperature of the liquid falls below 60° F. the volume is contracted and therefore this should be compensated for by adjusting the ball 18 to a lower position so that the volumetric displacement will be smaller, and consequently the registration by the registering device 40 will be the same as if the temperature were 60° F. In other words, when the temperature of the liquid is above the predetermined amount it tends to cause too great a registration at the registering device 40, whereas when the temperature falls below the predetermined amount, the registration will be smaller than it should be.

For the purpose of accurately adjusting the meter to compensate for variations in temperature, I have secured at 52 to the lower end of the key stem 47 a cup-shaped dial 53 having a cylindrical periphery 54 on the cylindrical surface of which is mounted a temperature scale plate 55 as shown in Figs. 1 and 2. To facilitate turning of the dial 53, a portion of the periphery thereof may be knurled as shown at 56 in Fig. 2.

Detachably mounted by means of the screws 57 on the outer wall of the bowl 43, is an index plate 58 provided with a vertical series of arrows 59 corresponding to the horizontal lines 60 on the scale plate 55.

By turning the dial 53 toward the left as viewed in Fig. 2, the upright lines 61 may be brought into registry with one of the arrows 59 at the left-hand edge 62 of the gravity plate 58. Such left-hand turning of the dial 53 will effect lowering of the ball 18 of Fig. 1, and consequently decrease the volumetric displacement of the liquid to compensate for lower temperature thereof.

When the dial is turned toward the right as viewed in Fig. 1 for a higher temperature adjustment, the ball 18 will be lifted and the volumetric displacement increased to compensate for the expansion due to the higher temperature of the liquid. In other words, the adjustment of the meter by means of the dial 53 compensates for expansion or contraction of the liquids and automatically insures accuracy in measurement based on 60° F. The temperature scale plate 55 having the upright lines 61 thereon with the temperature designations at the upper ends of the lines as shown in Fig. 2, is calibrated by actual tests so that when the dial is set by means of the index plate 58, the meter will make accurate measurements whenever desired.

When it is desired to set the dial the temperature of the liquid is determined by means of a thermometer and the dial set accordingly. For instance, in Fig. 2 the dial is set for enabling the meter to register accurately liquids of 30° Baumé at 76° F.

The temperature scale plate is also calibrated for variations in specific gravity of the liquid being metered. By referring to Fig. 4 which shows one of the scale plates developed into a plane surface, it will be seen that the temperature line for 60° F. is vertical. Therefore when the scale plate is on the cylindrical dial as shown in Fig. 2 and the gravity plate 58 is secured in the position as shown and the temperature of the liquid is 60° F., the meter will register accurately for various specific gravities. In Fig. 5 a gravity plate 58' is shown having a range of gravity indexes from 48 to 64 Baumé, A. P. I. (American Petroleum Institute). In the space 63 of the plate 58 and in the space 63' of the plate 58' are designations of corresponding specific gravities in ordinary use representing specific gravities compared with water at its greatest density, namely, 4° C. These corresponding specific gravity designations in the spaces 63 and 63' are for liquids lighter than water such as gasoline, naphtha, etc.

By actual tests the temperature lines 61 are obtained. That is to say, by calibration the curves 61 are predetermined so as to be accurately in position for the various pointers or indexes 59 of the specific gravity designations. For instance, Fig. 2 shows the setting of the dial for a liquid having a temperature of 76° F. and the specific gravity of .8762, which is 30 Baumé, A. P. I.

Inasmuch as the range of specific gravity is greater than can be conveniently distributed on an index plate for a single dial, it is desirable to provide a plurality of dials and I have therefore shown in Fig. 1 that the dial 53 is detachably connected by means of the bolts 52 to the key stem 47. A nut 64 may be detached from the lower end of the key stem 47 and then after the bolts 52 are loosened the dial may be completely detached from the key stem 47 and this dial may be replaced by another with another scale plate 55 thereon. In a similar manner a corresponding gravity index plate 58 may be used by substituting the same for the detachable gravity plate 58 shown in Fig. 2. If desired, the scale plate 55 itself may be detached from the cylinder 54 and another plate mounted thereon.

Fig. 2 shows a gravity index plate 58 for the A. P. I. gravity readings ranging from 19 to 35, inclusive, and corresponding to a temperature range extending from 40° to 140° F.

If the temperature range of the liquid is from 40° to 108° F. and the A. P. I. specific gravity readings range from 48 to 64, inclusive, the plates 55' and 58' shown in Figs. 4 and 5 may be substituted for the plates 55 and 58 shown in Fig. 2.

Figs. 6 and 7 show an additional illustration of the various sets of temperature scale plates and gravity plates that may be used in connection with the adjusting dial. Fig. 6 shows a temperature scale plate 55" with a range of temperature from 40° to 96° F. and useful with this plate is a gravity plate 58" having gravity readings ranging from 66 to 82, inclusive.

In practice it is found that seven sets of temperature dial plates and specific gravity plates are sufficient for practical purposes in connection with the measuring of liquids higher than water. For a temperature range from 40° to 130° F. the gravity plate ranges from 28 to 44, inclusive, A. P. I. For a temperature range from 40° to 120° F. the gravity range is from 36 to 52, inclusive, A. P. I. For a temperature range from 24° to 92° F. the gravity range is from 48 to 64, inclusive, A. P. I. For a temperature of 40° to 102° F. the gravity range is from 56 to 72, inclusive, A. P. I. As stated above, the scale of specific gravities in the left-hand columns of the gravity plates is the Baumé scale accepted by the American Petroleum Institute. From the foregoing it will be seen that there is a greater range of temperature on the dials for low specific gravities than on those for higher specific gravities. This is due to the fact that higher gravity liquids have a greater range of expansion and consequently the temperature range must be reduced proportionately in order to be placed on the dials since the scale plates are all of one standard size for a given meter.

When the one who sells certain liquids wishes to give the customer an additional pint or other predetermined quantity without having it register on the meter, he may do so by using the modified construction shown in Fig. 3. The gravity plate 65 is provided with substantially the same specific gravity designations as shown in Fig. 2, but the scale plate 66 is narrower than the scale plate 55 of Fig. 2. When the temperature of the liquid flowing through the meter is 70° F. and the specific gravity is .868, the dial will be set as shown in Fig. 3.

By adding the vertical indexes A and B, index arrows 67 and 68 are provided so as to enable the setting of the dial for the flow of additional amounts without registration. For instance, if the dial is set with the second arrow 67 on the temperature line of 70° F. the volumetric displacement in the meter is increased by the movement of the dial 53 to the right as shown in Fig. 3 through a short angle as determined by the index A, the ball 18 of Fig. 1 will be elevated and consequently the piston 14 will be elevated.

By moving the dial 53 toward the right so that the second arrow of the index B will be on the temperature line of 70° F., two additional pints may be passed through the meter without registration. That is to say, the meter may be so adjusted as to accurately register the flow of liquid having a certain temperature and specific gravity so that the registration shall be the same as if the temperature were 60° F. with the exception that an additional pint or two may be dispensed as samples without registration by the meter. This enables the buyer to extract a pint or two as samples so that he can make the necessary test to see that the contents of the barrel or other container are in accordance with specifications before emptying such barrel or other container. The arrangement shown in Fig. 3 is particularly useful in connection with meters which register relatively large units such as barrels.

Obviously those skilled in the art may make various changes in the details and arrangement of parts without departing from the spirit and scope of the invention as defined by the claims hereto appended and I wish therefore not to be restricted to the precise construction herein disclosed.

Having thus fully disclosed an embodiment of my invention, what I desire to secure by Letters Patent of the United States is:

1. The combination with a meter having adjusting means therefor, of calibrated scale means carried by the meter and operatively associated with the adjusting means to indicate the setting of the adjusting means in accordance with the temperature and specific gravity of the liquid being metered, and additional means to indicate a setting of the adjusting means to cause a definite predetermined quantity of liquid to pass through the meter in addition to the quantity actually metered without being registered by the meter.

2. The combination with a meter having a frame member and adjusting means relatively shiftable with respect to the frame, of a cylindrical scale having spaced-apart downwardly extending temperature lines and spaced-apart horizontal specific gravity lines, and means forming an index, said scale and index being operatively associated and connected the one to the frame and the other to the adjusting means in position to mutually cooperate to indicate settings of the adjusting means in accordance with the temperature and specific gravity of liquid being metered.

3. The combination with a meter having a frame member and adjusting means relatively shiftable with respect to the frame, of a cylindrical dial connected to said adjusting means and having spaced-apart downwardly extending temperature lines and spaced-apart horizontally extending specific gravity lines, and an index plate secured to the frame of the meter in position to cooperate with the dial and having thereon gravity designations registering with said horizontal lines of the dial and index markings for intersection with said temperature lines to enable setting of said adjusting means in accordance with the temperature and specific gravity of the liquid being metered.

4. The combination with a liquid meter having a registering device operated by the meter, of adjusting means for changing the unit capacity of the meter with respect to the registering device and calibrated means to indicate the setting of said adjusting means in accordance with the temperature and specific gravity of the liquid being metered, said calibrated means comprising an index and a scale having iso-thermic specific gravity lines and being relatively shiftable with respect to the index to bring the lines thereof opposite the index, said index having a portion adapted to intersect the lines of the scale and having specific gravity graduations thereon with which the isothermal lines may be registered, said scale and index being connected the one for movement with the adjusting means and the other upon a stationary portion of the meter.

5. The combination with a displacement type fluid meter, of shiftable means for adjusting the displacement of said meter, and calibrated means, including a graduated scale and co-operating index, means for relatively moving the scale and index in proportion to the movement of the shiftable means whereby to indicate and determine the movement of the shiftable means necessary to adjust the displacement of the meter to cause it to register accurately under various metering conditions represented on the graduated scale, and additional indexing means mounted in spaced relationship with respect to the first named index and co-operatively associated with said scale for indicating the setting of said shiftable means to cause the flow of a predetermined quantity of fluid through the meter without registration together with the quantity actually registered under any operating condition within the range included in said scale.

6. The combination with a meter having a frame and adjusting means relatively shiftable with respect to the frame, of a scale having spaced apart iso-thermic specific gravity lines, and means forming an index, said scale and index being operatively associated and connected the one to the frame and the other to the adjusting means in position to mutually co-operate with the index intersecting the iso-thermal lines to indicate settings of the adjusting means in accordance with the temperature and specific gravity of a liquid to be metered, an additional index mounted in spaced relationship with respect to the first named index and in position to co-operate with said scale whereby to indicate the setting of adjusting means to cause the flow of a predetermined quantity of fluid through the meter without registration together with the quantity actually registered under any operating condition within the range included in said scale.

7. The combination with a meter having a frame member, and adjusting means relatively shiftable with respect to the frame member, of a scale having spaced apart iso-thermal lines, means forming an index having specific gravity indices, said scale and index being operatively connected the one to the frame member and the other to the adjusting means in position to mutually co-operate in order to indicate settings of the adjusting means in accordance with the temperature and specific gravity of liquids being metered.

HOSMER L. BLUM.